United States Patent [19]

Iwata et al.

[11] Patent Number: 6,038,396
[45] Date of Patent: Mar. 14, 2000

[54] COMPILING APPARATUS AND METHOD FOR A VLIW SYSTEM COMPUTER AND A RECORDING MEDIUM FOR STORING COMPILE EXECUTION PROGRAMS

[75] Inventors: Yasushi Iwata, Sagamihara; Akira Asato, Kawasaki, both of Japan

[73] Assignee: Fujitsu Limited, Kawasaki, Japan

[21] Appl. No.: 09/042,799

[22] Filed: Mar. 17, 1998

[30] Foreign Application Priority Data

Oct. 29, 1997 [JP] Japan .................................. 9-296950

[51] Int. Cl.[7] ....................................................... G06F 9/45
[52] U.S. Cl. ................................................................ 395/706
[58] Field of Search ............................................... 395/706

[56] References Cited

U.S. PATENT DOCUMENTS

| | | | |
|---|---|---|---|
| 5,317,734 | 5/1994 | Gupta ........................................ | 395/706 |
| 5,475,824 | 12/1995 | Grochowski et al. .................. | 712/206 |
| 5,499,350 | 3/1996 | Uchida et al. ........................... | 712/220 |

OTHER PUBLICATIONS

Hwang et al. Efficeint Code Generation for Digital Signal Processors with Parallel and Pipelined Instructions. IEEE. pp. 243–252, May 1997.

IBM Research:*Basic Principles of VLIW Architectures*, http://www.research.ibm.com/vliw/basic.html, Copyright 1995, jmoreno@watson.ibm.com (1 page).

IBM Research: *VLIW at IBM Research*, http://www.research.ibm.com/vliw/home.html, Copyright 1995, jmoreno@watson.ibm.com (2 pages).

*Primary Examiner*—Tariq R. Hafiz
*Assistant Examiner*—Wei Zhen
*Attorney, Agent, or Firm*—Staas & Halsey LLP

[57] ABSTRACT

A compiling apparatus and method, and a recording medium, are used to facilitate assembly code programming of a VLIW computer system. An instruction of an intermediate code format, designated for each slot of the VLIW instruction, is divided corresponding to each slot and stored into a plurality of intermediate code files. The instructions of the intermediate code format stored in the intermediate code files are then read in serially to execute an instruction scheduling process, taking into account dependency between instructions. The serialized instructions of the intermediate code format are converted into parallel assembly code, and an object program of the parallel assembly code is output.

15 Claims, 15 Drawing Sheets

FIG. 6(a)

INTERMEDIATE CODE FILE 1

1: fmul %f4, %f5, %f8;
2: fldx %f9, [%r6+%r0];
3: add %r4, %r2, %r3;
4: sub %r11, %r9, %r2;
5: switch
6: fmul %f11, %f12, %f13;
7: fmac %f13, %f2, %f7; %acc0;
8: fmul %f14, %f11, %f10;

FIG. 6(b)

INTERMEDIATE CODE FILE 2

1: fmac %g9, %g20, %g30, %acc0;
2: fmac %g10, %g19, %g29, %acc0;
3: ldx %r10, [%r4+%r11];
4: fmul %g4, %g2, %g0;
5: fadd %g9, %g1, %g1;

FIG. 7

```
1:  fmul %f4, %f5, %f8;       sub %r11, %r9, %r2;      fmac %g9, %g20, %g30, %acc0;                nop;
2:  fmul %f11, %f12, %f13;    fldx %f9, [%r6+%r0];     fmul %g4, %g2, %g0;                         nop;
3:  nop;                      add %r4, %r2, %r3;       fmac %g10, %g19, %g29; %acc0;               nop;
4:  fmul %f14, %f11, %f10;    nop;                     fadd %g9, %g1, %g1;          ldx %r10, [%r4+%r11];
5:  fmac %f13, %f2, %f7, %acc0;  nop;                  nop;                                        nop;
6:  nop;                      nop;                     nop;                                        nop;
```

INTERMEDIATE CODE FILE 1,2

DOTTED LINE INDICATES A SERIALIZING PATH

```
1 :  fadd    %f1, %f0, %f30;
2 :  fsub    %f2, %f1, %f31;
3 :  fmul    %f4, %f1, %f29;
4 :  fadd    %f1, %f2, %f30;
5 :  fsub    %f3, %f2, %f30;
6 :  fsub    %f2, %f4, %f1;
7 :  fadd    %f4, %f3, %f2;
8 :  fmul    %f5, %f1, %f4;
```

FIG. 12

| | SLOT | | | | ARITHMETIC UNIT | | | | OUTPUT REGISTER | | | | | | | | | | |
|---|---|---|---|---|---|---|---|---|---|---|---|---|---|---|---|---|---|---|---|
| | A | B | C | D | ALU1 | ALU2 | MUL1 | MUL2 | f1 | f2 | f3 | f4 | f5 | f6 | f7 | f8 | f9 | f10 | |
| CLOCK 0 | 1 | | | | 1 | | | | | | | | | | | | | | |
| CLOCK 1 | | | | | | | | | | | | | | | | | | | |
| CLOCK 2 | 2 | 3 | | | 2 | | | 3 | | | | | | | | | | | |
| CLOCK 3 | | | | | | | | | 1 | | | | | | | | | | |
| CLOCK 4 | 4 | 5 | | | 4 | 5 | | | | 2 | 3 | | | | | | | | |
| CLOCK 5 | | 6 | | | | 6 | | | | | | | | | | | | | |
| CLOCK 6 | | | | | | | | | | | | 4 | 5 | | | | | | |
| CLOCK 7 | 7 | | | | 7 | | | | | | | | | | | | | | |
| CLOCK 8 | | | | | | | 8 | | | | | | | 6 | 7 | | | | |
| CLOCK 9 | 8 | | | | | | | | | | | | | | | | | | |
| CLOCK 10 | | | | | | | | | | | | | | | | | | | |
| CLOCK 11 | | | | | | | | | | | | | | | | 8 | | | |
| CLOCK 12 | | | | | | | | | | | | | | | | | | | |

FIG. 13

```
fadd   %f1, %f0, %f30;    nop;    nop;             nop;
nop;                      nop;    nop;             nop;
fsub   %f2, %f1, %f31;    fmul   %f4, %f1, %f31;   nop;   nop;
nop;                      nop;    nop;             nop;
fadd   %f1, %f2, %f30;    fsub   %f3, %f2, %f30;   nop;   nop;
nop;                      fsub   %ff2, %f4, %f1;   nop;   nop;
nop;                      nop;    nop;             nop;
fadd   %f4, %f3, %f2;     nop;    nop;             nop;
nop;                      nop;    nop;             nop;
fmul   %f5, %f1, %f4;     nop;    nop;             nop;
```

COMPILING APPARATUS AND METHOD FOR A VLIW SYSTEM COMPUTER AND A RECORDING MEDIUM FOR STORING COMPILE EXECUTION PROGRAMS

CROSS-REFERENCE TO RELATED APPLICATIONS

This application is based on, and claims priority to, Japanese Patent application 9-296950, filed Oct. 29, 1997 in Japan, and which is incorporated herein by reference.

BACKGROUND OF THE INVENTION

1. Field of the Invention

The present invention relates to an apparatus and method for compiling programs, and more particularly, to an apparatus and method for compiling programs used in a Very-Long Instruction Word (VLIW) computer system and to a recording medium storing thereon a compile execution program.

2. Description of the Related Art

FIG. 16 is a prior art diagram illustrating assembly code of a VLIW (Very-Long Instruction Word) system computer requiring parallel programming. As illustrated in FIG. 16, the assembly code of the VLIW system is a parallel program. That is, the instructions are executed in groups simultaneously and in parallel with each other, and the groups of parallel-executed instructions are executed sequentially as shown along the time axis, as shown along the space axis in FIG. 16.

In conventional VLIW computer systems, instructions for each slot of the VLIW instruction code must be manually programmed. Since VLIW computer system programming is in parallel, manual assembly of the code requires considerable time and often results in error. Additionally, it is very difficult to achieve efficient performance from manually assembled code. Hence, the quality of the assembly code, compiled for use by the VLIW computer system, is dependent upon the abilities and skill levels of the programmers. As a result, it is difficult to achieve meaningful industrial application and wide-spread use of computer systems having the VLIW architecture.

Therefore, a need exists to provide an efficient programming method and architecture which alleviates the above-identified problems.

SUMMARY OF THE INVENTION

It is an object of the present invention to provide an efficient programming method which alleviates from the programmer the need to provide a description of a load of simultaneous processes across the space axis.

It is a further object of the present invention to divide the assembly code programming of the VLIW system computer instructions into instruction groups to be inserted into one or more partial slots forming a VLIW instruction.

In one embodiment of the present invention, a compiling apparatus compiles an instruction stream executable by a VLIW system computer. The VLIW instruction stream includes a plurality of instruction elements, and the VLIW system computer executes in parallel the instruction elements of the VLIW instruction.

The compiling apparatus of the present invention comprises at least one intermediate code file storage device storing a plurality of intermediate code files dividing and storing instructions of an intermediate code format to be described for each slot of the VLIW instruction based on each slot. The compiling apparatus of the present invention also comprises a serializing processing unit serializing and reading the instructions of the intermediate code format which have been divided and stored as a plurality of intermediate code files.

In addition, the compiling apparatus of the present invention comprises an instruction scheduling unit registering a number corresponding to each of the serialized instructions of the intermediate code format to a writing area of a resource reservation table to produce the resource reservation table, a paralleled assembly code converting unit converting the serialized instructions of the intermediate code format into parallel assembly code based on the instruction number in the resource reservation table produced by the instruction scheduling unit, and a paralleled assembly code output unit outputting an object program of the parallel assembly code converted by the paralleled assembly code converting unit.

In another embodiment of the present invention, a compiling method compiles an instruction stream to be executed by a VLIW system computer. The VLIW instruction includes a plurality of instruction elements. The VLIW system computer executes in parallel each instruction element of the VLIW instruction.

The compiling method of the present invention comprises the steps of dividing an instruction of the intermediate code format to be described to each slot of the VLIW instruction depending upon each slot, then storing the divided instructions to a plurality of intermediate code files, and a serializing process serializing and reading the instruction of the intermediate code format divided and stored in the plurality of the intermediate code files.

The compiling method of the present invention further comprises an instruction scheduling process registering a number, corresponding to each serialized instruction of the intermediate code format, to a writing area of a resource reservation table to produce the resource reservation table, a paralleled assembly code converting process converting the serialized instruction of an intermediate code format to the parallel assembly code based on an instruction number in the resource reservation table produced in the instruction scheduling step, and a paralleled assembly code output process outputting an object program of the parallel assembly code converted by the paralleled assembly code converting process.

In yet another embodiment of the present invention, a recording medium readable by a computer stores a compile execution program. The compile execution program of the present invention compiles an instruction stream to be executed by a VLIW system computer. The VLIW system computer executes in parallel each instruction element of the VLIW instruction, which includes a plurality of instruction elements. The compile execution program comprises the steps of a process dividing an instruction of the intermediate code format to be described in each slot of the VLIW instruction corresponding to each slot and storing the divided instructions to a plurality of intermediate code files, and a serializing process serializing and reading the instruction of the intermediate code format divided and stored in the plurality of the intermediate code files.

The compile execution program of the present invention also comprises the steps of an instruction scheduling process registering a number, corresponding to each serialized instruction of the intermediate code format, to a writing area of resource reservation table to produce the resource reservation table, a paralleled assembly code converting process converting the serialized instruction of an intermediate code format to parallel assembly code based on an instruction number in the resource reservation table produced in the instruction scheduling process, and a paralleled assembly code output process outputting an object program of the parallel assembly code converted by the paralleled assembly code converting process.

In one aspect of the present invention, a NOP instruction is not located in the intermediate code file.

In another aspect of the present invention, a NOP instruction is inserted in the paralleled assembly code converting unit or process.

In yet another aspect of the present invention, slots are defined as a plurality of slots which are less than the total number of slots of the VLIW instruction, and the instructions of the intermediate code format allocated to each slot are located in at least one intermediate code file.

In still another aspect of the present invention, control information, specifying timing for using a common resource between instructions described in different intermediate code files, is located in the intermediate code file.

These together with other objects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 6A is a diagram showing an example of an intermediate code file to which the switch statement is applied;

FIG. 6B is a diagram showing another example of an intermediate code file to which the switch statement is applied;

FIG. 7 is an exemplary diagram illustrating a VLIW instruction generated using the method of the present invention;

FIG. 12 is an exemplary diagram illustrating a resource reservation table in accordance with the present invention;

FIG. 13 is an exemplary diagram illustrating the assembly code of a 4-parallel VLIW computer system generated from the assembly code shown in FIG. 10;

DETAILED DESCRIPTION OF THE PREFERRED EMBODIMENT

Figure 1:
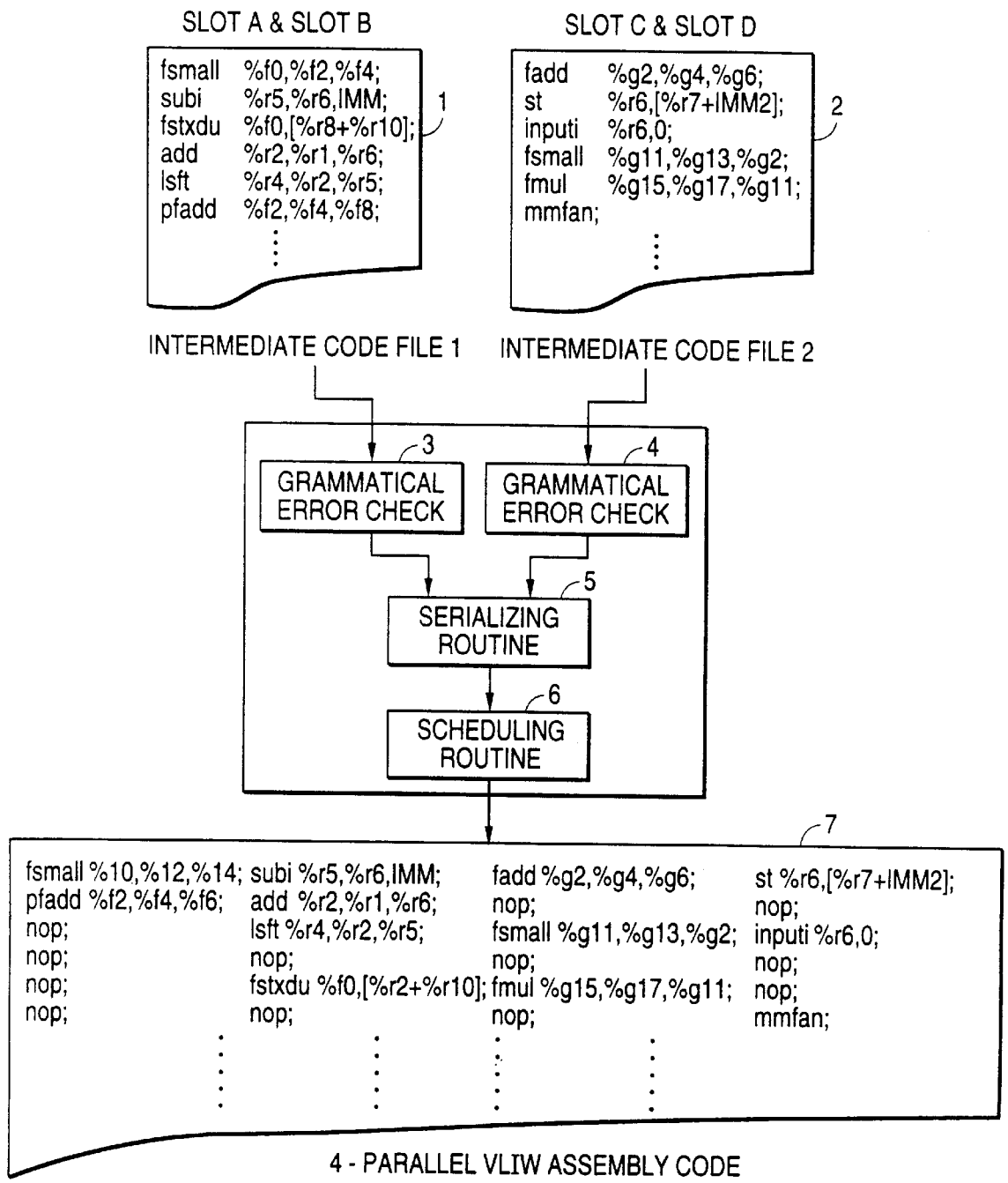
FIG. 1 is an exemplary diagram illustrating the principle of the present invention.

FIG. 1 is an exemplary diagram illustrating one embodiment of the present invention. Referring to FIG. 1, intermediate code files 1 and 2 include programmed assembly code created by an assembly code programmer. More specifically, intermediate code file 1 includes intermediate code for slots A and B, and intermediate code file 2 includes intermediate code for slots C and D. In the present invention, a programmer is released from parallel programming by describing the division of the intermediate codes into several files. The intermediate codes are sent to a serializing process unit (not shown in FIG. 1), in parallel, whereupon the serializing process unit performs a grammatical error check routine.

The intermediate codes from intermediate code file 1 are sent to grammatical error check routine 3, and the intermediate codes from intermediate code file 2 are sent to grammatical error check routine 4. The grammatical error check routines 3 and 4 check for any grammatical errors in the intermediate code located in intermediate code files 1 and 2, respectively. When the grammatical error check has been completed and satisfied by grammatical error check routines 3 and 4, the grammatically correct intermediate codes are converted to linear assembly code by a serializing routine 5 executed in the serializing process unit 13. The linear assembly code satisfies a dependence relationship of system resources. Instruction scheduling unit (not shown in FIG. 1) then performs a scheduling routine 6 on the linear assembly code, placing the linear assembly code into the proper VLIW instruction format. A 4-way parallel (4-parallel) VLIW assembly code 7 is then output by the instruction scheduling unit (not shown in FIG. 1) to an object program file storage device (not shown in FIG. 1).

Figure 2:
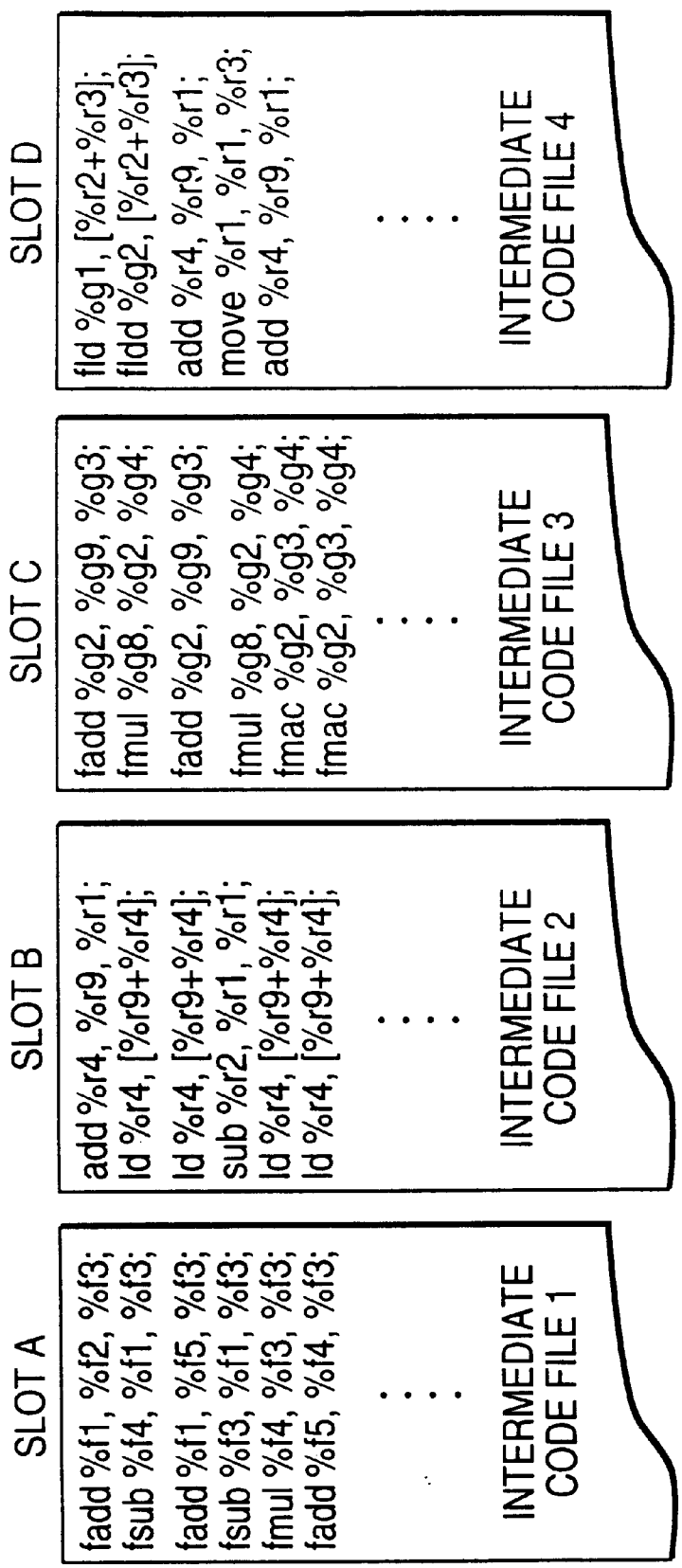
FIG. 2 is an exemplary diagram of the present invention illustrating an example of multiple intermediate code files corresponding to multiple slots.

The above described embodiment is not limited, however, to just two intermediate code files. FIG. 2 is an exemplary diagram illustrating an example of multiple intermediate code files corresponding to multiple slots. For example, two or more intermediate code files may be used corresponding to any number of operational slots, i.e. A, B, C and D, as illustrated in FIG. 2.

Figure 3:
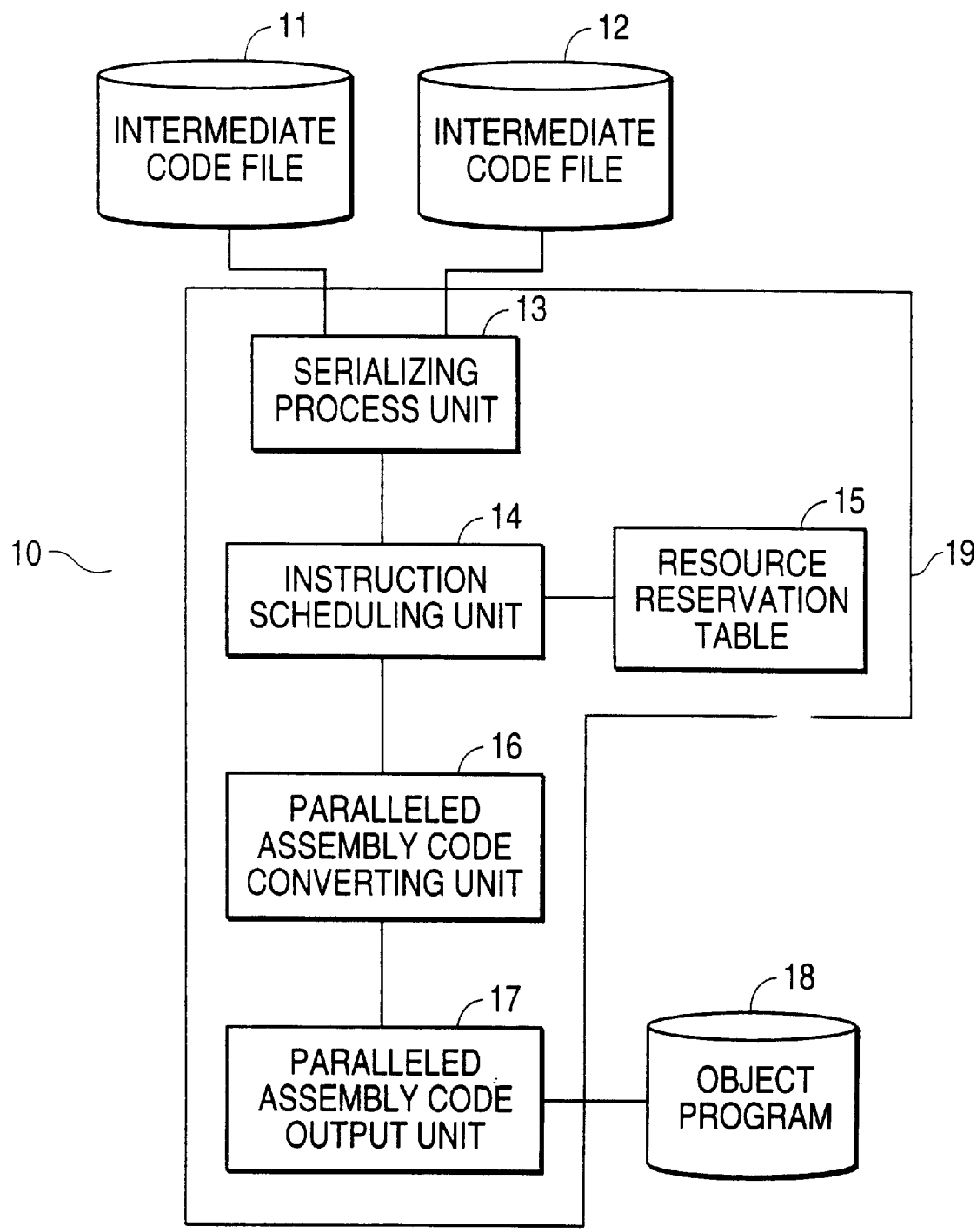
FIG. 3 is an exemplary diagram of a compiling apparatus of a preferred embodiment of the present invention.

FIG. 3 is an exemplary diagram of a compiling apparatus 10 of a preferred embodiment of the present invention. The compiling apparatus includes intermediate code files 11 and 12, a serializing process unit 13, an instruction scheduling unit 14, a resource reservation table 15, a paralleled assembly code converting unit 16, a paralleled assembly code output unit 17, and an object program file 18. The serializing process unit 13, the instruction scheduling unit 14, the resource reservation table 15, the paralleled assembly code converting unit 16, and the paralleled assembly code output unit 17 are provided in a parallel code producing unit 19.

Intermediate code files 11 and 12 shown in FIG. 3 respectively correspond to intermediate code files 1 and 2 shown in FIG. 1. The serializing process unit 13 shown in FIG. 3 executes, for example, grammatical error check routines 3 and 4, and serializing routine 5 (shown in FIG. 1). Additionally, the instruction scheduling unit 14 shown in FIG. 3 executes, for example, scheduling routine 6 (shown in FIG. 1), and object program file 18 stores, for example, the 4-way parallel (4-parallel) VLIW assembly code 7 (shown in FIG. 1).

Figure 4:
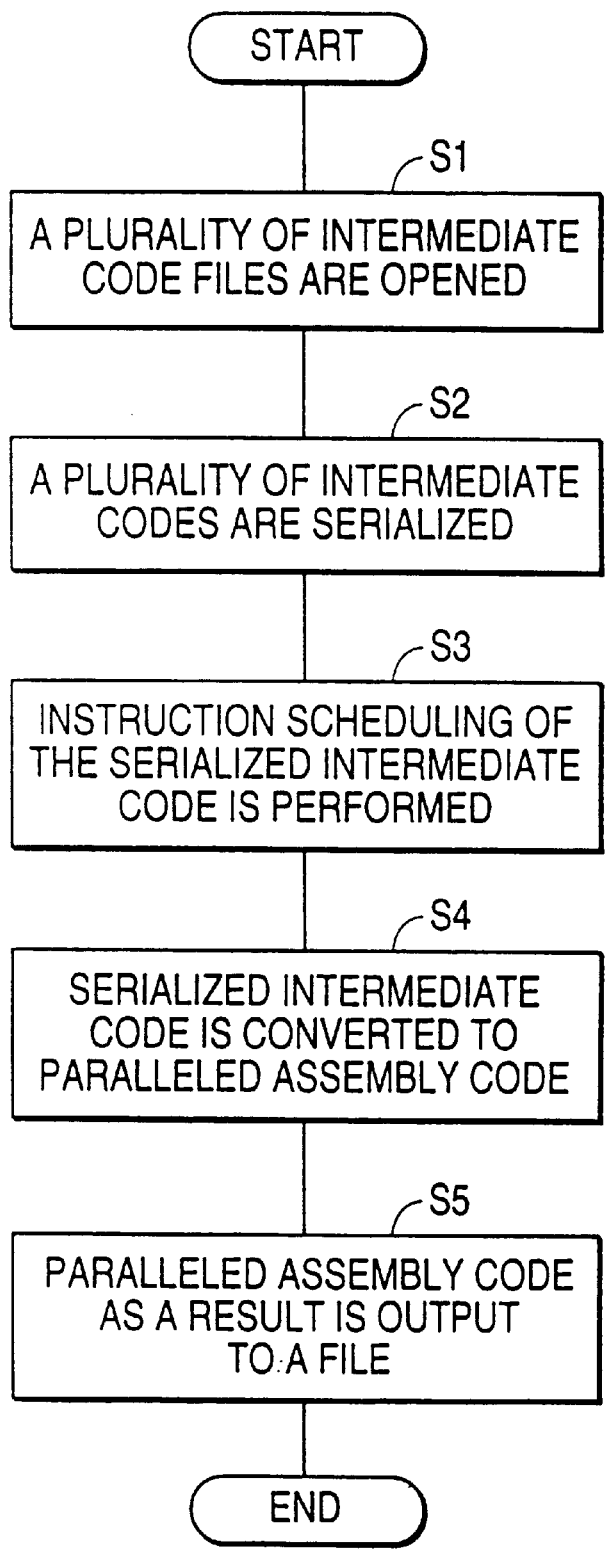
FIG. 4 is an exemplary diagram illustrating a flowchart of a compiling method of an embodiment of the present invention.

Operation of the apparatus of the present invention disclosed in FIG. 3 will now be described with reference to FIGS. 1 and 4. FIG. 4 is an exemplary diagram illustrating a flowchart of a compiling method of a preferred embodiment of the present invention. Referring to FIG. 4, the method illustrates an example of producing a 4-way parallel (4-parallel) VLIW instruction from 2-way parallel (2-parallel) assembly code.

As shown in FIG. 4, the compiling method of the preferred embodiment of the present invention comprises step S1 in which a plurality of intermediate code files are opened. Then, in step S2, a plurality of intermediate codes are serialized and in step S3, instruction scheduling of the serialized intermediate code files is executed. As shown in step S4, the serialized intermediate code files are converted to parallel assembly code, and in step S5, the paralleled assembly code is output as a result to a file.

In the preferred embodiment of the present invention, a programming system producing 4-parallel VLIW instruction from 2-parallel assembly code is realized, as explained with reference to FIG. 1. As shown in FIG. 1, a programmer describes the assembly code into the intermediate code files 1 and 2 as the input file. Intermediate code file 1 is permitted to include only the instructions to be described into slot A and slot B among the 4-parallel VLIW instruction, while intermediate code file 2 is permitted to include only the instruction to be described in slot C and slot D in the same manner. The respective intermediate code files are checked by the grammatical error check routines 3, 4 to ensure that there is no grammatical error.

In this embodiment of the present invention, the resources processed by floating decimal point operations are independent between the slots A,B and slots C,D in the 4-parallel VLIW instruction. In particular, a mutually dependent relationship is never generated, in regard to the floating decimal point operation, between the intermediate code file 1 in which the instructions for the slots A,B are written and the intermediate code file 2 in which the instructions for slots C,D are written. However, the resource processed by integer operation instructions is commonly used between the slots A,B and C,D. Therefore, a dependent relationship is generated between the integer operation instructions described in the intermediate code files 1 and 2. In order to explicitly describe this dependent relationship, the ".Switch statement" is introduced, as explained with reference to FIG. 5.

Figure 5:
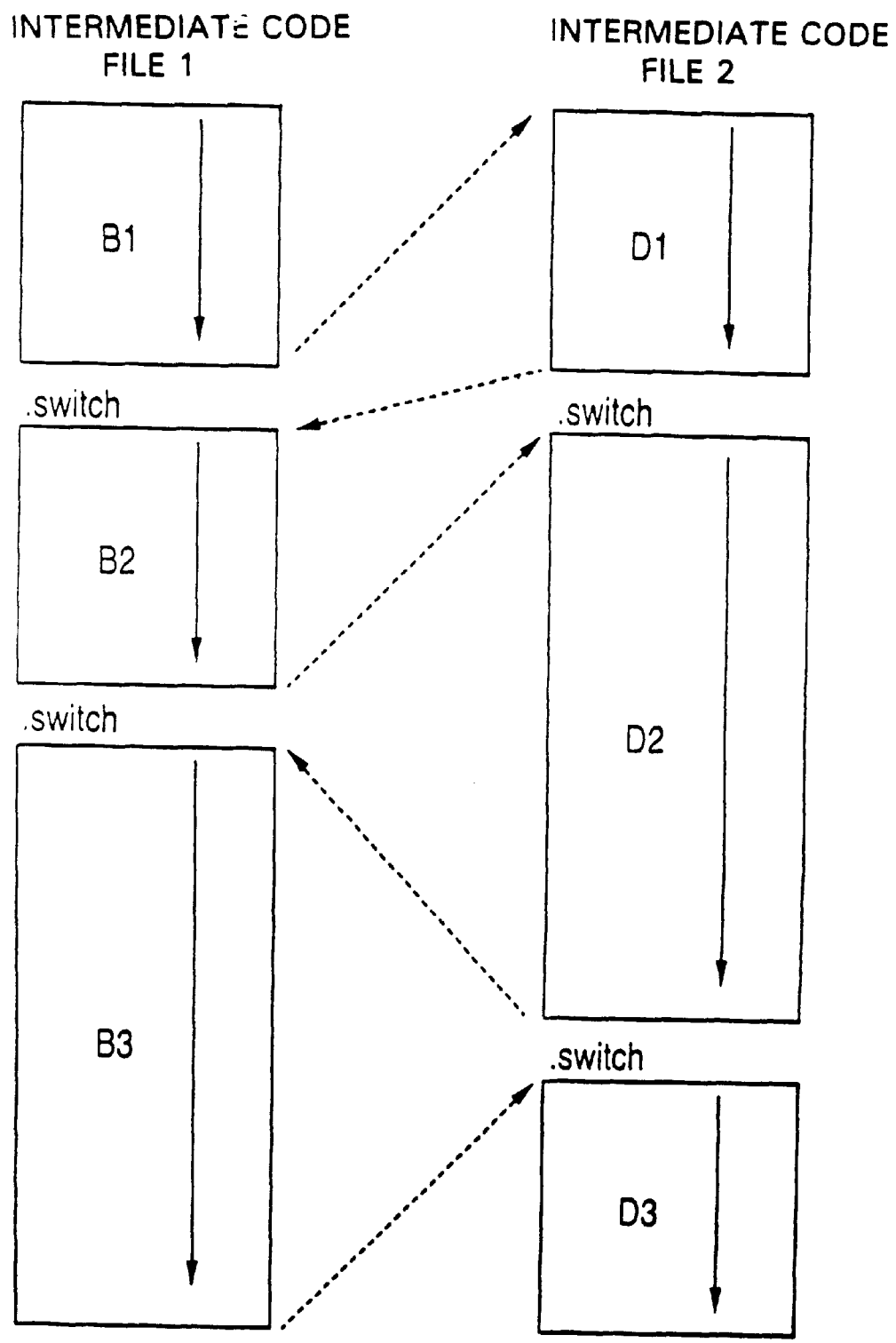
FIG. 5 is an exemplary diagram of the present invention illustrating a solution of the dependence relationship with a switch element.

FIG. 5 is an exemplary diagram illustrating a solution of the dependent relationship with a ".Switch statement". As shown in FIG. 5, blocks B1, B2, B3, D1, D2 and D3 indicate the blocks where instructions are described. The dependent relationship of the instruction stream described in the intermediate code files 1 and 2 is expressed as B1 -->D1 -->B2 -->D2 -->B3 -->D3, as illustrated in FIG. 5. For example, when there is a dependent relationship of the process in instructions in block B1 and block D1, arithmetic operations executed in block B1 are executed before arithmetic operations are executed in block D1.

FIGS. 6A and 6B show examples of intermediate code files to which the ".Switch statement" is applied. FIG. 6A shows the contents of intermediate code file 1, and FIG. 6B shows the contents of intermediate code file 2. FIG. 7, described in further detail herein below, shows the VLIW instruction produced as a result of the above-mentioned process.

In FIG. 6A, integer registers r4 and r11 are computed in the third and fourth lines, respectively, of the intermediate code file 1, represented by the expressions "add % r4,% r2,% r3;" (line 3) and "sub % r11,% r9,% r2;" (line 4). Since the ".Switch statement" (switch) is not executed until the fifth line of intermediate code file 1, the result of r4 and r11 computed in lines 3 and 4 of intermediate code file 1 is reflected in the r4 and r11 used in the load instruction in the third line of intermediate code file 2 ("ldx % r10, [% r4+% r11];"), as illustrated in FIG. 6B. Hence, execution of the expression "ldx % r10, [% r4+% r11];" occurs after the execution of the expressions "add % r4,% r2,% r3;" and "sub % r11,% r9,% r2;".

As a result of applying the above-identified process to the 2-parallel VLIW instruction illustrated in FIGS. 6A and 6B, a 4-parallel VLIW instruction is produced from the 2-parallel VLIW instruction, as illustrated in FIG. 7 (described in detail below). In this regard, the expressions "add % r4,% r2,% r3;" and "sub % r11,% r9,% r2;" are executed in the first and third lines, respectively, of slot B of the 4-parallel VLIW instruction, prior to the execution of "ldx % r10, [% r4+% r11];" in the fourth line of slot D of the 4-parallel VLIW instruction. Hence even when a dependent relationship exists between resources found in separate intermediate code files (i.e. intermediate code files 1 and 2), execution of the operation can still be performed.

Introduction for the above-mentioned ".Switch statement", which is an instruction for explicitly describing the above-mentioned dependent relationships, enables the description of the VLIW instruction. The VLIW instruction is described by dividing the assembly code as executed in the present invention even when there is a dependent relationship between the resources used by the instruction in the divided intermediate code file.

FIG. 7 is an exemplary diagram illustrating a VLIW instruction generated using the method of the present invention. The illustrated code is a 4-parallel VLIW instruction generated by converting the 2-parallel VLIW instruction, illustrated in FIG. 6, using the method according to the present invention described herein above. As illustrated by the 4-parallel VLIW instruction, execution of the expressions "add % r4,% r2,% r3" and "sub % r11,% r9,% r2" occur prior to the execution of the expression "ldx % r10, [% r4+% r11]". In this regard, the dependency relationship existing between the resources used by the integer instructions is maintained. That is, the 4-parallel VLIW instruction executes the instructions in the same dependent relationship as the instructions would have been executed in FIGS. 6A and 6B.

The operation of the serializing process unit 13 shown in FIG. 4 is described with reference to FIGS. 8A and 8B.

Figure 8A:
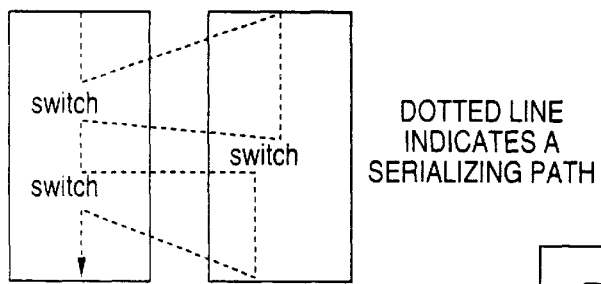
FIG. 8A shows profiles of intermediate code files of the present invention.
Figure 8B:
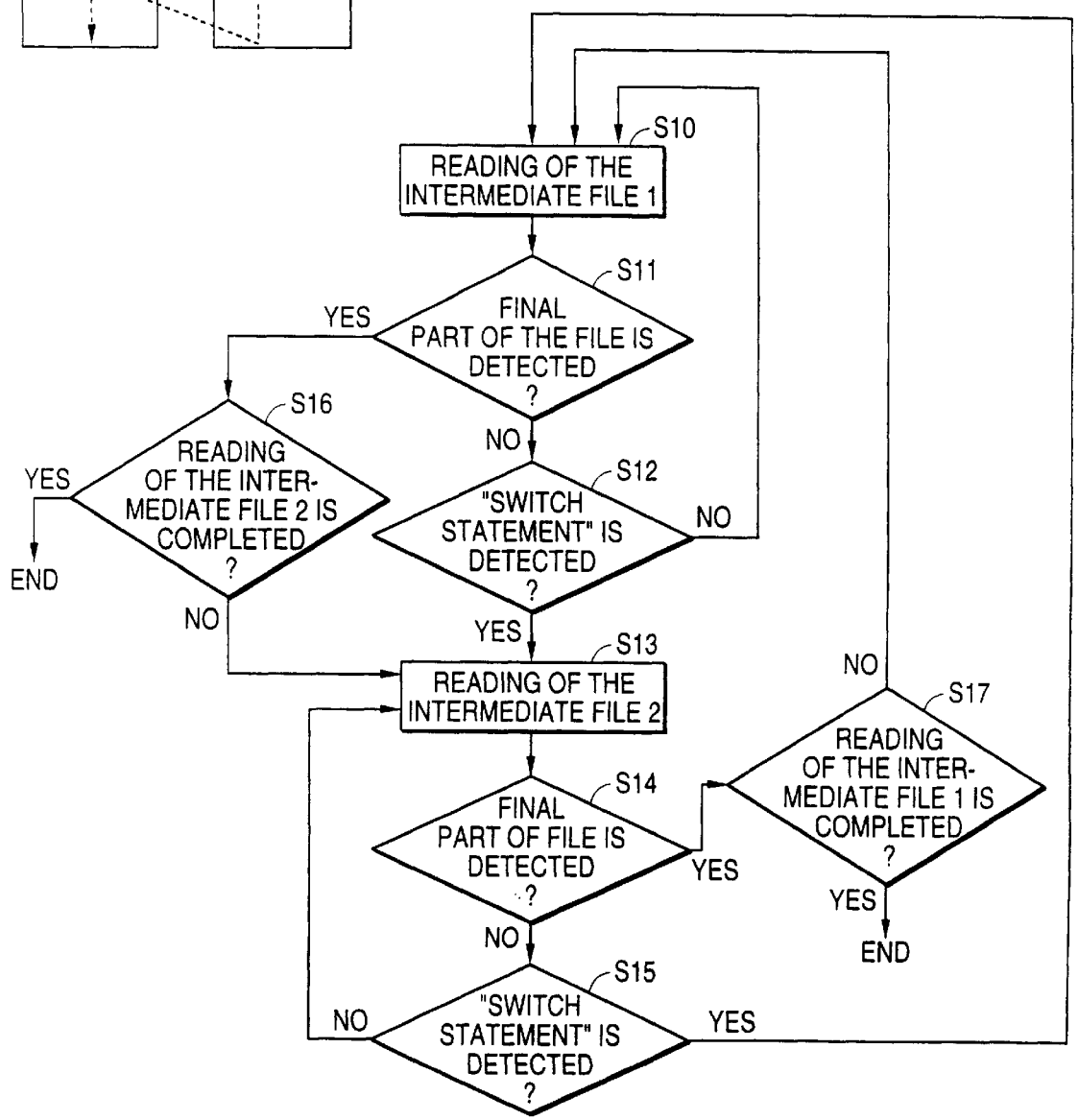
FIG. 8B shows a serializing routine in the serializing processing unit of the present invention.

FIG. 8A is an exemplary diagram showing profiles of the intermediate code files 1 and 2, and FIG. 8B is an exemplary diagram illustrating a detailed operation of the serializing processing unit of the present invention.

More specifically, FIG. 8A shows profiles of the intermediate code files 1 and 2 to be serialized in the order along the path represented by the dotted line. FIG. 8B illustrates the serializing routine executed by serializing process unit 13 used to execute serialization to the intermediate code files 1 and 2.

Operation of the serialization routine will now be described with reference to FIGS. 8A and 8B. Serialization begins in step S10, where an instruction code from intermediate code file 1 is first read. The serialization routine, executed by the computer system, determines whether the instruction code from intermediate code file 1 is the last instruction code stored in the intermediate code file 1 in step S11.

If the routine determines that the instruction code is not the last instruction code in the intermediate code file 1, then in step S12, it is determined whether the instruction code is a ".Switch statement". If it is determined by the routine that the instruction code is not a ".Switch statement", then the routine returns to step S10, and the next instruction code is read from the intermediate code file 1. When, however, the routine determines in step S12 that the instruction is a ".Switch statement", intermediate code file 2 is read in step S13.

During steps S10 (intermediate code file 1 reading routine) and S13 (intermediate code file 2 reading routine), grammatical error check routines 3 and 4 (not shown in FIGS. 8A or 8B) are executed, respectively, as described above.

Similar to the process regarding the instruction codes from intermediate code file 1, the routine determines whether the instruction code from intermediate code file 2 is the last instruction code stored therein, in step S14. In step S15, if the routine determines that the instruction code is not the last instruction code in intermediate code file 2, then the routine determines whether or not the instruction code is a ".Switch statement". If the instruction code is not a ".Switch statement", the routine returns to step S13 and reads the next instruction code from intermediate code file 2.

If, on the other hand, the routine determines that a ".Switch statement" has been read from intermediate code file 2 in step S15, then the routine proceeds to step S10, where intermediate code file 1 is read.

As each ".Switch statement" is detected as an instruction code in reading either intermediate code file 1 or intermediate code file 2, steps S10–S15 are repeated.

When the routine determines that the last instruction code has been read from intermediate code file 1 in step S11, the routine then determines whether the last instruction code has been read from intermediate code file 2 in step S16. If the routine determines that the last instruction code has not been read from intermediate code file 2, then reading of intermediate code file 2 continues in step S13. When, on the other hand, the routine determines that the last instruction code has been read from intermediate code file 2 in step S16, the serialization operation is completed.

If the routine determines that the last instruction code in intermediate code file 2 has been read in step S14, then the routine proceeds to step S17.

In step S17, the routine determines whether reading of the instruction code file 1 is complete. If reading of the instruction code file 1 is complete, then the serialization operation ends. If the reading of the instruction code file 1 is not complete, then the routine proceeds back to step S10, where the next instruction code is read from the intermediate code file 1, and the process is repeated.

Figure 9:
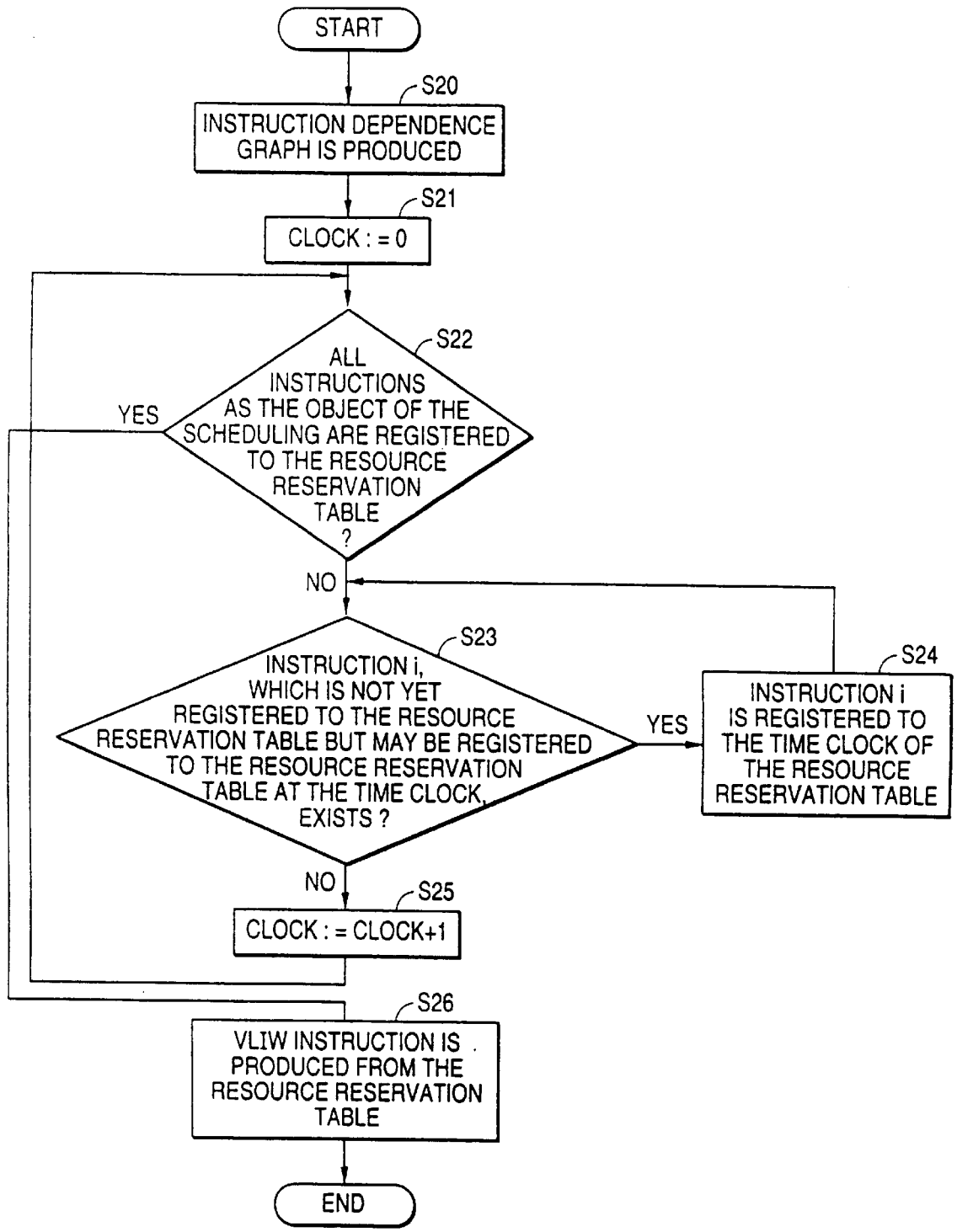
FIG. 9 is an exemplary diagram illustrating an operation sequence of the instruction scheduling unit and paralleled assembly converting unit of the present invention.

FIG. 9 is an exemplary diagram illustrating an operation sequence of the instruction scheduling unit and paralleled assembly code converting unit of the present invention. More specifically, FIG. 9 illustrates the operational routines of instruction scheduling unit 14 and paralleled assembly code converting unit 16 (shown in FIG. 3, but not shown in FIG. 9).

The operation of instruction scheduling unit 14 and paralleled assembly code converting unit 16 will now be described with reference to FIG. 9. In step S20, an instruction dependence graph, such as the instruction dependence graph illustrated in FIG. 11 (described in detail below), is generated by instruction scheduling unit 14. CLOCK is then set to zero in step S21. In step S22, the routine determines whether or not all of the instructions which need to be scheduled have been registered in the resource reservation table, such as the resource reservation table illustrated in FIG. 12.

When the routine determines in step S22 that registration has not been completed, the routine determines whether or not an instruction i (wherein i is an instruction not registered in the resource reservation table in the current time clock) exists in step S23. If the routine determines that the instruction i exists in step S23, the instruction i is registered to the current time clock of the resource reservation table in step S24, and returns to step S23. If, on the other hand, the routine determines that the instruction i does not exist in step S23, the CLOCK is increased by one in step S25, and the routine returns to step S22.

Upon completion of registration in step S22, a corresponding 4-parallel VLIW instruction is generated by the routine in paralleled assembly code converting unit 16 using the information registered in the resource reservation table in step S26. This 4-parallel VLIW instruction, generated in the paralleled assembly code converting unit 16, is then stored by paralleled assembly code output unit 17 in object program file storage device 18.

Figures 10, 11:
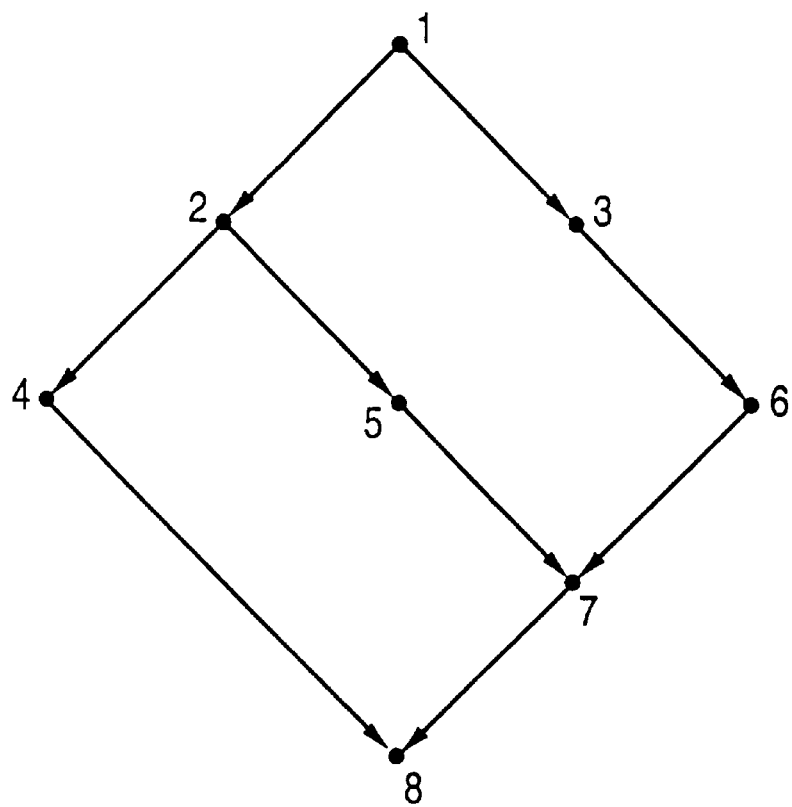
FIG. 10 is an exemplary diagram illustrating assembly code serialized from an intermediate code file of the present invention.
FIG. 11 is an exemplary diagram illustrating a dependence graph of the assembly code of the present invention.

FIG. 10 is an exemplary diagram illustrating assembly code linearly serialized from an intermediate code file in the present invention. The linearly serialized code is illustrative of the operation of the routine described above with reference to FIG. 9. For example, in line 1 of the code (line numbers, followed by a colon (:), have been added to the code for convenience of explanation), the sum of the registers f0 and f30 is stored in register f1. In line 2 of the code shown in FIG. 10, the difference between the registers f1 and f31 is stored in register f2. Hence, the code in line 2 is dependent on the code in line 1. That is, in order for the difference between f1 and f31 to be calculated, the sum must first be stored in register f1.

The instruction dependence graph referred to in step S20 of FIG. 9 means the graph indicating the dependence relationship between the assembler instructions as shown in FIG. 10.

The dependence graph illustrated, for example, in FIG. 11, shows this dependency.

FIG. 11 is an exemplary diagram illustrating a dependence graph of the assembly code according to the present invention. In the dependence graph, the "●" (referred to as a node) indicates an instruction in the code, and the number (for example, "1") located next to the node indicates the line number of the respective instruction. Additionally, the arrow mark (referred to as an arc) indicates the dependence relationship. For example, the first instruction has a dependence relationship with the second instruction and the third instruction. That is, the value of register f1 produced as a result of the "add" instruction in the first line is used for calculation in the instructions of the second and third lines of code, as shown in FIG. 10. In this regard, the dependence relationship may be described in one graph. However, in the present invention, the node as the starting point is not limited to a single node, and the node as the ending point is not limited to a single node.

The activity of filling the resource reservation table based upon the dependence graph of FIG. 11 generated as explained above is referred to as scheduling.

FIG. 12 is an exemplary diagram illustrating a completed resource reservation table in accordance with the present invention. The resources in FIG. 12 are generally indicated by the terms "slot", "arithmetic unit" and "output register". More specifically, the resources are designated as slots A, B, C and D, arithmetic units ALU1, ALU2, MUL1 and MUL2, and output registers f1–f10. These resources are matched with an actual processor.

The operation of scheduling the resource reservation table will now be described with reference to FIG. 12. The resource reservation table is filled according the routine illustrated by FIG. 9. For example, the instruction code on line 1 of FIG. 10 is assumed to be issued at the first clock time 0 of slot A. To indicate this on the resource reservation table, a "1" is written into the clock time 0 column of slot A. Since the instruction code on line 1 is an "add" (addition) instruction, the ALU is used. Hence, a "1" is written to the ALU1 column of the arithmetic unit, indicating that ALU1 is used at clock time 0.

Next, the time which is written into the output register upon completion of the actual arithmetic operation is written to the table in the output register file. In this example, it is assumed that all arithmetic operations are completed within two clock cycles. Hence, a "1" is written to the output register f1 in the resource reservation table in the line corresponding to clock 2, indicating that output register f1 of the first instruction is written at clock time 2.

Next, the second instruction shown in FIG. 10 is examined. The dependence graph shown in FIG. 11 suggests that instruction 2 depends upon instruction 1. Since the second instruction depends upon the calculation of the first instruction, the second instruction can be generated only after the output of the first instruction is defined in the resource reservation table. As the output of the first instruction is defined at clock time 2 in the resource reservation table, the second instruction is generated after clock time 2. Similar to the first instruction, an ALU is used to perform the "sub" (subtract) calculation. In this example, two ALUs (ALU1 and ALU2) exist and both are available in clock time 2. Therefore, it is assumed that ALU1 is used. Since execution of the first instruction is completed before execution of the second instruction, ALU1 is no longer in use, and, therefore, may be used for the calculation of the second instruction. Hence, the second instruction may be scheduled (generated) in the resource reservation table in slot A during clock time 2.

Similarly, instruction 3 is also examined. As above, the third instruction depends on the calculation of the first instruction, and the third instruction can be generated only after the output of the first instruction is defined in the resource reservation table. As the output of the first instruction is defined at clock time 2 in the resource reservation table, the third instruction is generated after clock time 2. Since the third instruction is a "mul" (multiply), and the resource reservation table shows that the multiplier is available at clock time 2, the third instruction is scheduled (generated) in slot B during clock time 2 (it is assumed in this example that the multiplying instruction may be generated to slot B). The remaining instructions are scheduled in a similar manner.

The schedule stored in the resource reservation table is then used to generate the 4-parallel assembly code of the VLIW system. In this regard, the data stored in the "slot" column of the resource reservation table is used to generate the executable instruction code, while the vacant columns are used to generate "nop" instructions, as illustrated in FIG. 13.

In the above embodiment, an example of the serializing process using the ".Switch statement" is performed in a two intermediate code file environment. However, when three or more intermediate code files are used, for example, when four intermediate code files are used as shown in FIG. 2 (instructions are independently described for each slot), another control statement used in place of the ".Switch statement" is required.

Figure 14:
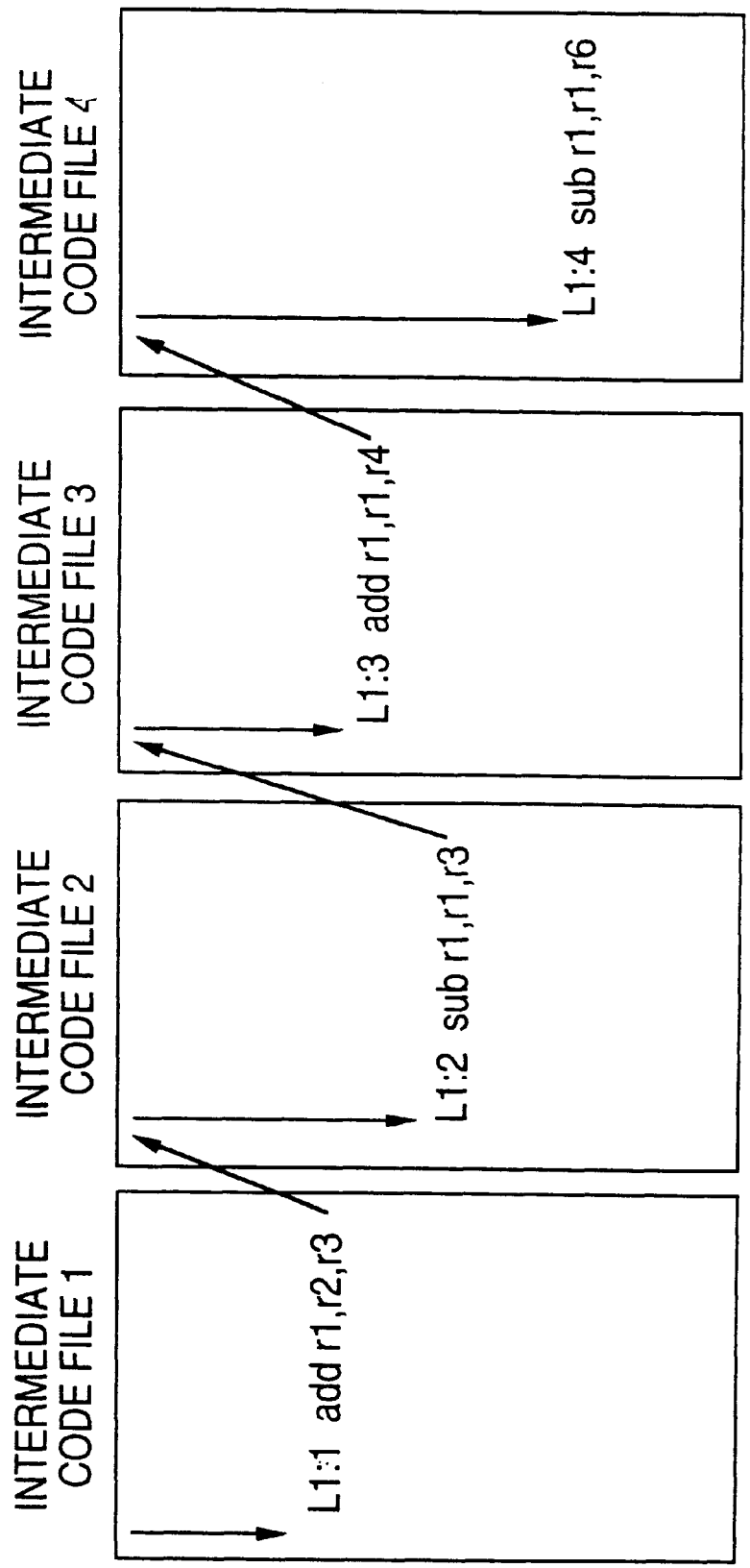
FIG. 14 is an exemplary diagram illustrating an example of the control statement used for serializing contents of separate intermediate code files of the present invention.

FIG. 14 is an exemplary diagram illustrating an example of the control statement used for serializing contents of four intermediate code files. In this example, a programmer inputs the sum of registers r2 and r3 into register r1 (add r1,r2,r3), and then inputs a value obtained by subtracting register r3 from register r1 into register r1 (sub r1,r1,r3). Register r4 is then added to register r1, and the value obtained is input into register r1 (add r1,r1,r4). Finally, the value stored in register r6 is subtracted from the value stored in register r1, and the difference is stored in register r1 (sub r1,r1,r6).

In this example, the respective instructions must be divided and described into four files. Each instruction is divided into four separate files, as indicated by intermediate code files 1, 2, 3 and 4. Additionally, and also as shown in FIG. 14, the programmer provides labels to the instructions and provides the generation sequence numbers after the labels. Accordingly, the instruction generation sequence number can be determined uniquely. In the example shown in FIG. 14, "L1" is the label name, and, following the label name and the colon (:), is a number representing the instruction generating sequence, such as "1".

Figure 15:
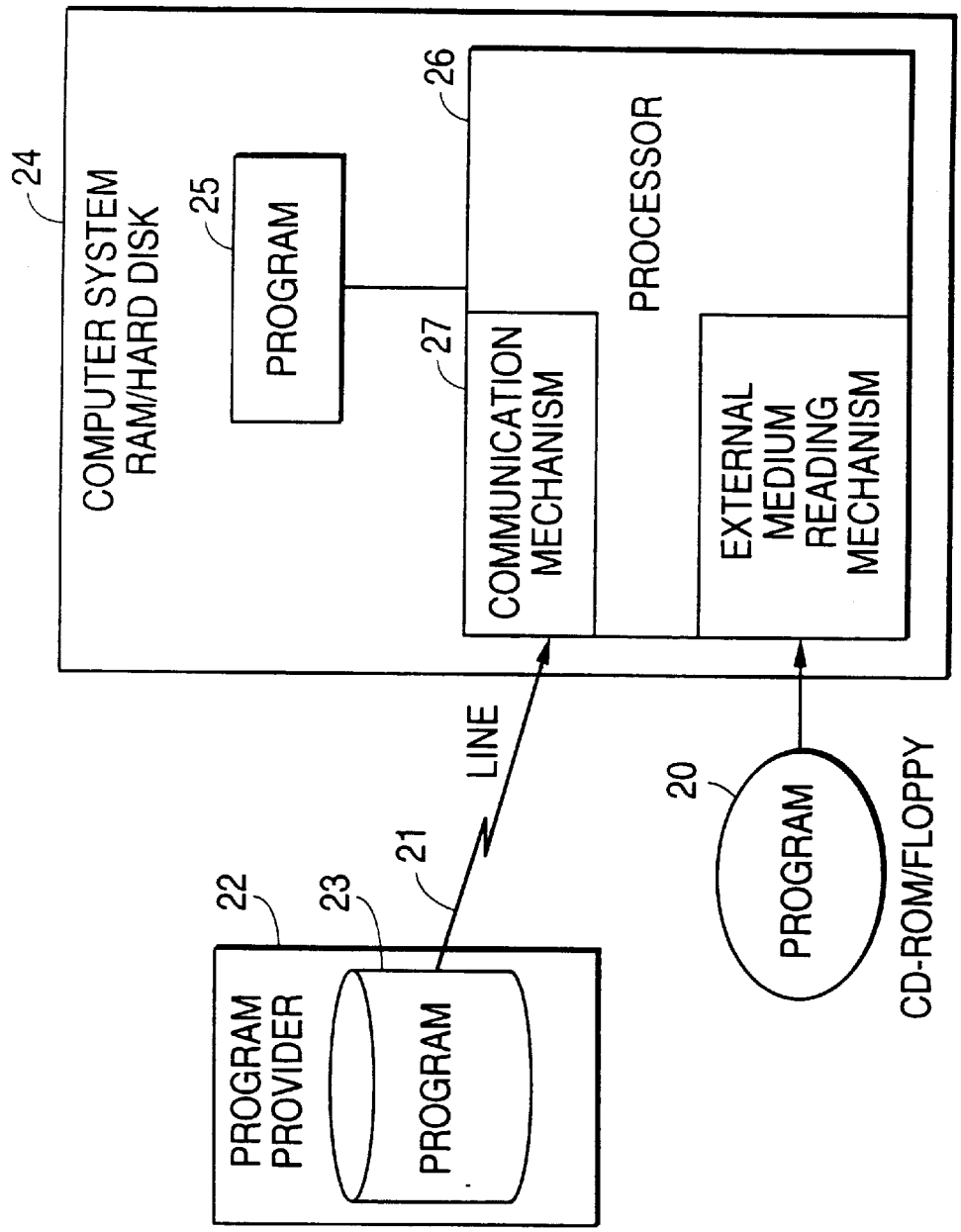
FIG. 15 is an exemplary diagram illustrating a recording medium, readable by a computer, recording a compile execution program in an embodiment of the present invention.
Figure 16:
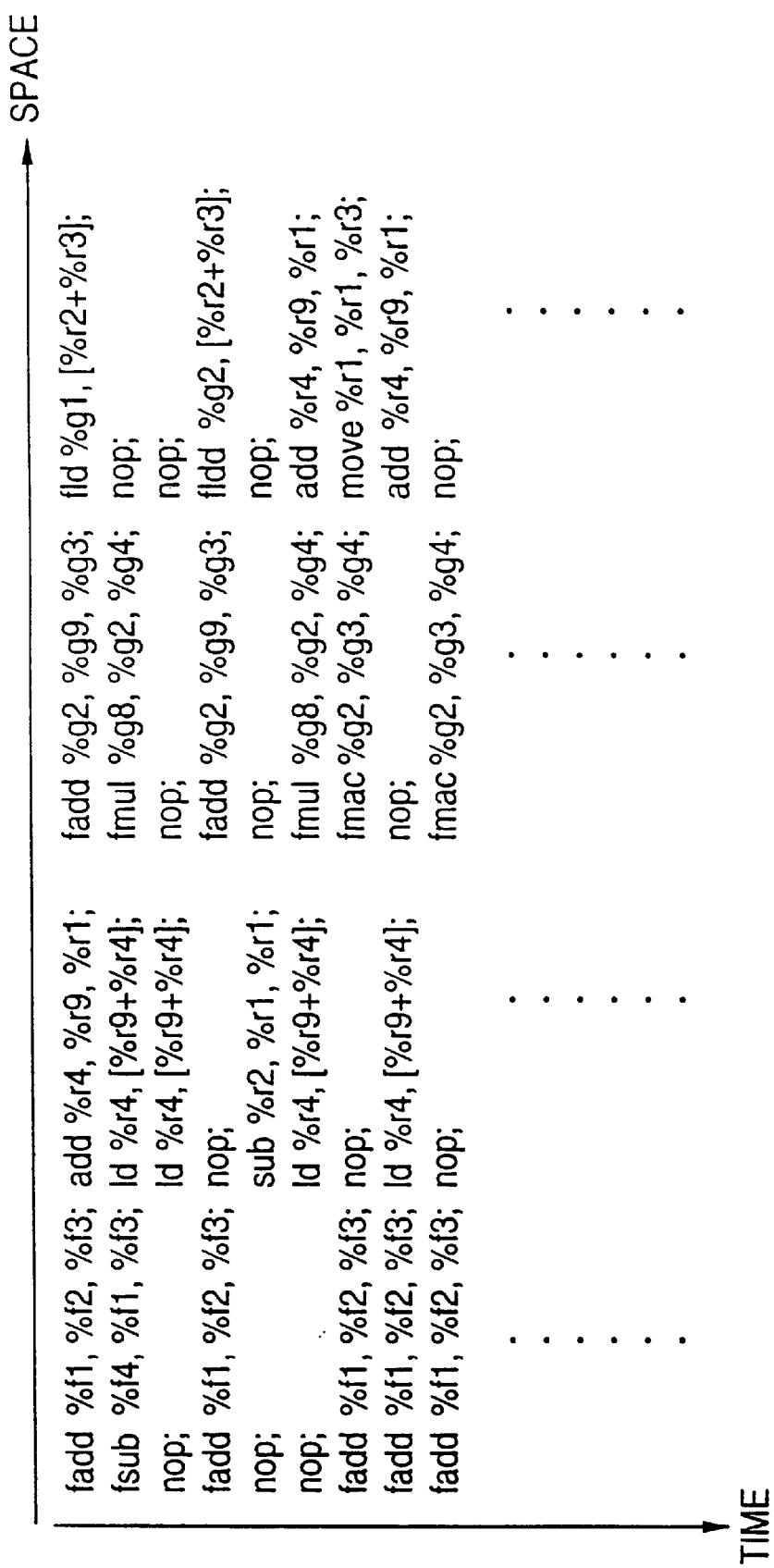
FIG. 16 is an exemplary prior art diagram illustrating assembly code of a VLIW computer system.

FIG. 15 is an exemplary diagram illustrating a recording medium, readable by a computer, recording a compile execution program in an embodiment of the present invention. The recording medium includes a removable portable memory medium 20 (such as a CD-ROM and floppy disk), a memory device 23 of program provider 22 (which provides programs through line 21 and communication mechanism 27), and a memory device 25 (such as a RAM and hard disk of computer 24 having installed programs). Additionally, the programs provided by the recording medium are loaded to a processor 26, and stored in the main memory.

As explained previously, according to the present invention, since the instructions to be executed in each slot of the VLIW instruction are individually stored in a number of intermediate code files, and parallel programming is not executed using the file of the intermediate format but the existing sequential programming of the assembly code is executed, the assembly code of the VLIW system can be programmed efficiently.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A compiling apparatus compiling an instruction stream executable by a VLIW system computer, said VLIW system computer executing in parallel instruction elements of a VLIW instruction, said compiling apparatus comprising:

at least one intermediate code file dividing and storing instructions of intermediate code format for each slot of the VLIW instruction based on the each slot;

a serializing processing unit serializing and reading the instructions of the intermediate code format which have been divided and stored as the plurality of intermediate code files;

an instruction scheduling unit registering a number, corresponding to each serialized instruction of the intermediate code format, to a resource reservation table;

a paralleled assembly code converting unit converting the serialized instruction of the intermediate code format into parallel assembly code based on the instruction number in the resource reservation table produced by the instruction scheduling unit; and a paralleled assembly code output unit outputting an object program of the parallel assembly code converted by the paralleled assembly code converting unit.

2. The compiling apparatus according to claim 1, wherein the intermediate code file does not include an NOP instruction.

3. The compiling apparatus according to claim 2, wherein an NOP instruction is inserted in the paralleled assembly code converting unit.

4. The compiling apparatus according to claim 1, wherein the each slot is defined by a plurality of slots which is less than the total number of slots of the VLIW instruction, and an instruction of the intermediate code format for each slot is located in at least one intermediate code file.

5. The compiling apparatus according to claim 1, wherein control information, specifying timing for using a common resource between instructions for different intermediate code files, is located in an intermediate code file.

6. A compiling method compiling an instruction stream to be executed by a VLIW system computer, said VLIW system computer executing in parallel each instruction element of a VLIW instruction, said method comprising the steps of:

a process dividing instructions having an intermediate code format into each slot of the VLIW instruction, and storing the divided instructions to a plurality of intermediate code files;

a serializing process serializing and reading the instructions of the intermediate code format stored in the plurality of intermediate code files;

an instruction scheduling process registering a number, corresponding to each serialized instruction of the intermediate code format, to a writing area of a resource reservation table to produce the resource reservation table;

a paralleled assembly code converting process converting the serialized instructions of the intermediate code format to parallel assembly code depending on an instruction number in the resource reservation table produced in the instruction scheduling process step; and a paralleled assembly code output process outputting an object program of the parallel assembly code converted by the paralleled assembly code converting process.

7. The compiling method according to claim 6, wherein the intermediate code file does not include an NOP instruction.

8. A compiling method according to claim 7, wherein the converting step further comprises inserting an NOP instruction.

9. The compiling method according to claim 6, further comprising the step of defining the slots as a plurality of slots which is less than the total number of slots of the VLIW instruction, and locating the instruction of the intermediate code format for each slot into at least one intermediate code file.

10. The compiling method according to claim 6, further comprising the step of specifying in the intermediate code file control information for use in specifying the timing of a common resource used by the instructions of different intermediate code files.

11. A recording medium, readable by a computer, storing a compile execution program for compiling an instruction stream to be executed by a VLIW system computer, said VLIW system computer executing in parallel each instruction element of the VLIW instruction, the compile execution program comprising the steps of:

a process dividing an instruction of the intermediate code format into each slot of the VLIW instruction, and storing the divided instructions to a plurality of intermediate code files;

a serializing process serializing and reading the instructions of the intermediate code format divided and stored in the plurality of intermediate code files;

an instruction scheduling process registering a number, corresponding to each serialized instruction of the intermediate code format, to a writing area of a resource reservation table to produce the resource reservation table;

a paralleled assembly code converting process converting the serialized instructions of the intermediate code format to parallel assembly code depending on an instruction number in the resource reservation table produced in the instruction scheduling process step; and a paralleled assembly code output process outputting an object program of the paralleled assembly code stream converted by the paralleled assembly code converting step.

12. The recording medium readable by a computer according to claim 11, wherein the intermediate code file does not include an NOP instruction.

13. The recording medium readable by a computer according to claim 12, wherein the converting step further comprises inserting an NOP instruction.

14. The recording medium readable by a computer according to claim 11, further comprising the step of defining the slots as a plurality of slots which is less than the total number of slots of the VLIW instruction, and locating the instructions of the intermediate code format for each slot into at least one intermediate code file.

15. The recording medium readable by a computer according to claim 11, further comprising the step of specifying in an intermediate code file control information for use in specifying the timing for use of a common resource between the instructions of different intermediate code files.

* * * * *